(12) United States Patent
Tsui

(10) Patent No.: US 6,249,673 B1
(45) Date of Patent: Jun. 19, 2001

(54) UNIVERSAL TRANSMITTER

(76) Inventor: Philip Y. W. Tsui, 3513 Ingram Rd., Mississauga (CA), L5L 4M4

( * ) Notice: Subject to any disclaimer, the term of this patent is extended or adjusted under 35 U.S.C. 154(b) by 0 days.

(21) Appl. No.: 09/188,648

(22) Filed: Nov. 9, 1998

(51) Int. Cl.[7] ............................................. H04B 1/02
(52) U.S. Cl. .................. 455/92; 455/88; 340/825.22; 340/825.69; 341/173; 341/176
(58) Field of Search .................. 455/92, 88; 340/825.22, 340/825.69, 825.72; 341/173, 176

(56) References Cited

U.S. PATENT DOCUMENTS

| | | |
|---|---|---|
| 4,535,333 | 8/1985 | Twardowski . |
| 4,623,887 | 11/1986 | Welles, II . |
| 4,626,848 | 12/1986 | Ehlers . |
| 4,771,283 | 9/1988 | Imoto . |
| 4,825,200 | 4/1989 | Evans et al. . |
| 4,878,052 | 10/1989 | Schulze . |
| 4,905,279 | 2/1990 | Nishio . |
| 4,959,810 | 9/1990 | Darbee et al. . |
| 5,227,780 | 7/1993 | Tigwell . |
| 5,379,453 | 1/1995 | Tigwell ............................. 455/151.2 |
| 5,564,101 | 10/1996 | Eisfeld et al. . |
| 5,619,190 | 4/1997 | Duckworth et al. . |
| 5,661,804 | 8/1997 | Dykema et al. . |
| 5,680,134 | 10/1997 | Tsui ...................................... 341/173 |
| 5,686,903 | 11/1997 | Duckworth et al. . |
| 5,699,055 | 12/1997 | Dykema et al. . |
| 5,790,948 | 8/1998 | Eisfeld et al. . |
| 5,793,300 | 8/1998 | Suman et al. . |
| 5,815,086 | 9/1998 | Ivie et al. . |
| 5,841,390 | 11/1998 | Tsui . |
| 5,854,593 | 12/1998 | Dykema et al. . |
| 5,903,226 | 5/1999 | Suman et al. . |
| 6,005,508 | 12/1999 | Tsui . |
| 6,008,735 | 12/1999 | Chiloyan et al. . |

*Primary Examiner*—Lee Nguyen
(74) *Attorney, Agent, or Firm*—Irell & Manella LLP

(57) ABSTRACT

A method and apparatus for providing a universal transmitter that can detect and emulate a transmission signal of a transmitter, the transmission signal having a corresponding transmission frequency and a corresponding modulation pattern. The universal transmitter comprises: a detection circuit that detects a frequency and a modulation pattern of a transmitted signal of a separate transmitter and a memory. A processor coupled to the detection circuit and the memory, stores a frequency value representative of the detected frequency and a plurality of value representative of the detected modulation pattern, in the memory. A transmitting circuit coupled to the processor, is operable to transmit an output signal having the frequency and the modulation pattern of the transmission signal.

10 Claims, 9 Drawing Sheets

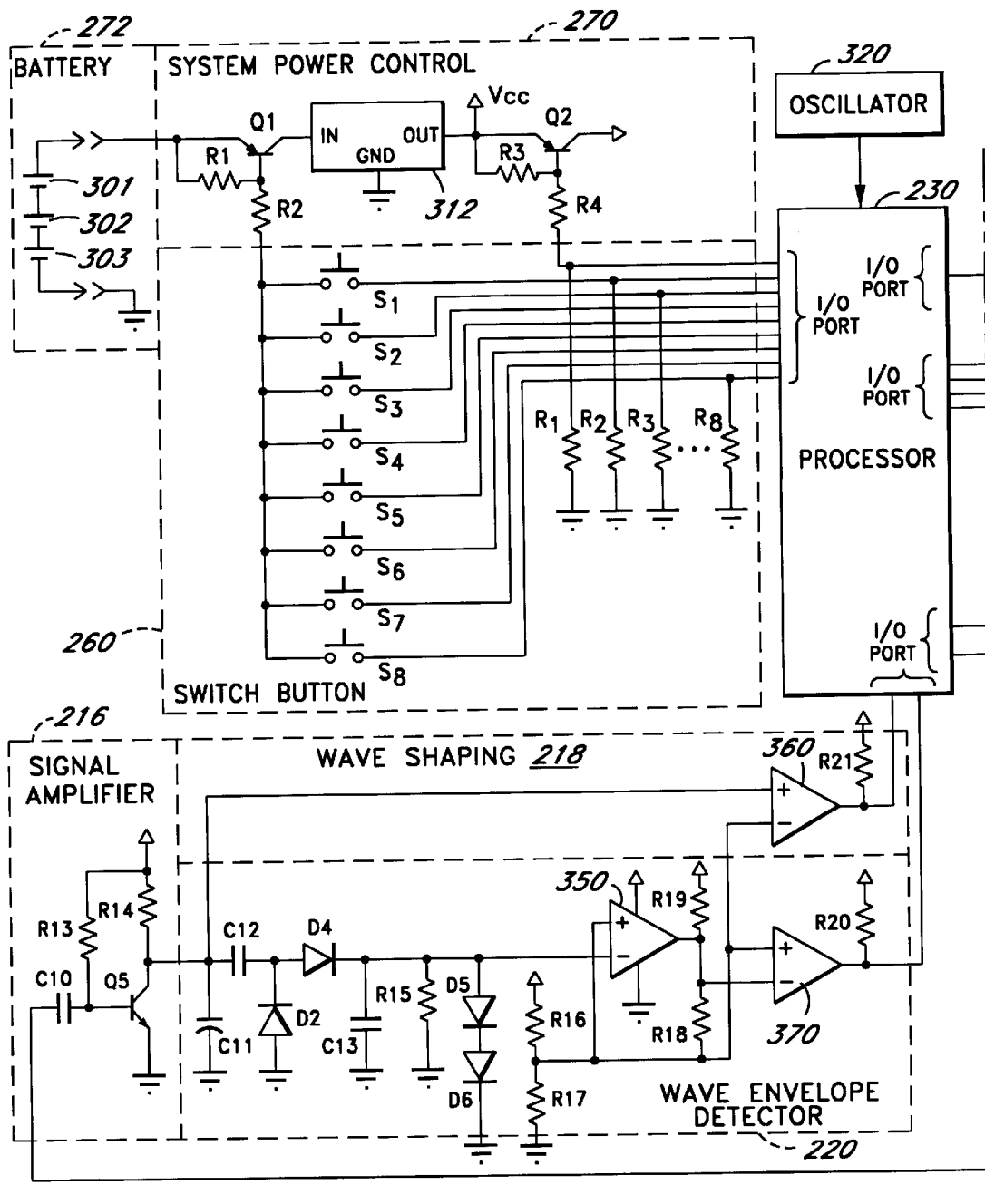

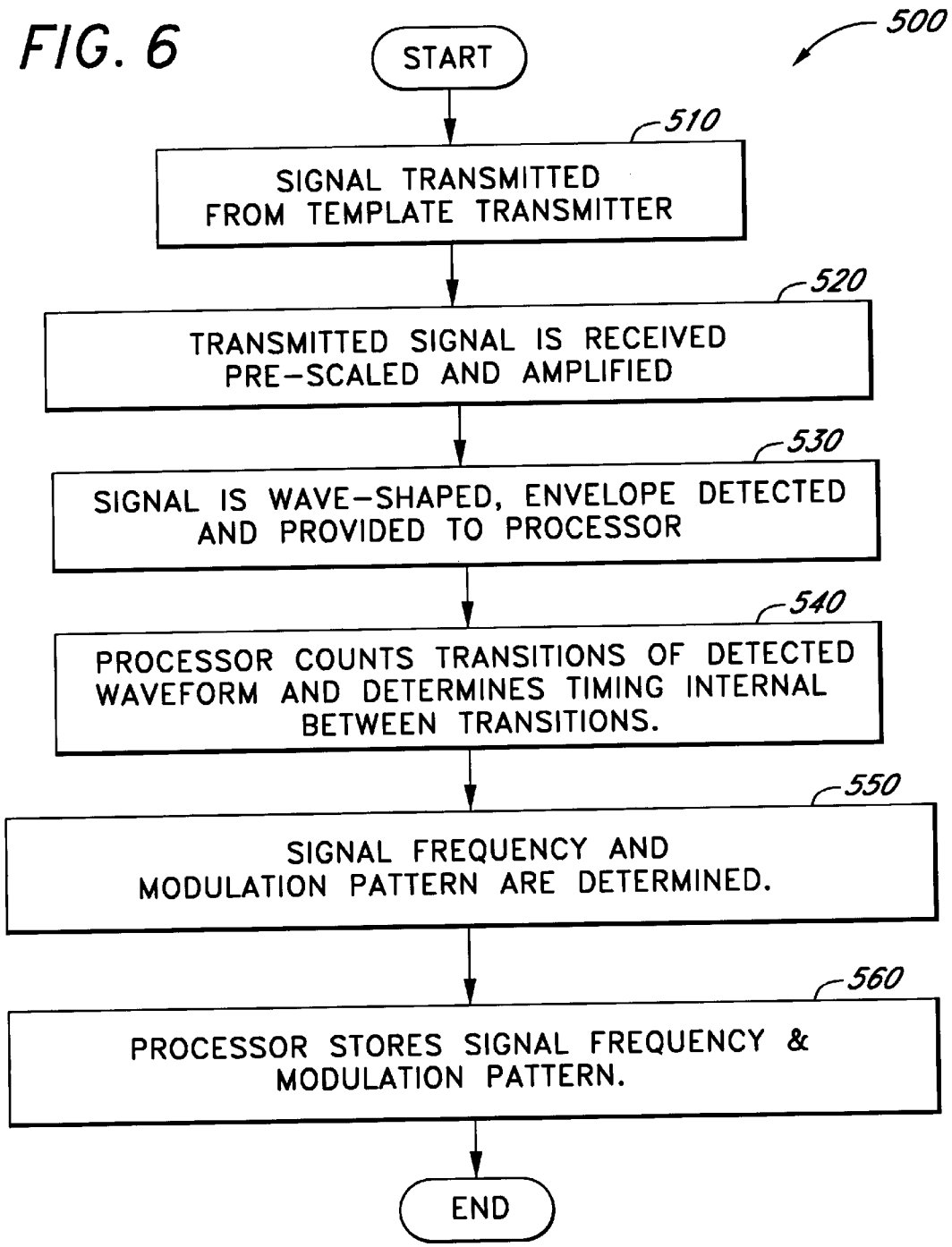

UNIVERSAL TRANSMITTER

BACKGROUND OF THE INVENTION

1. Field of the Invention

The invention is directed in general to remote control systems including transmitters and/or receivers which operate on a coded signal and, in particular, to a universal remote control transmitter that can acquire the transmission frequency and modulation pattern of another transmitter without a prior knowledge of these parameters.

2. Background of the Invention

Transmitter-receiver controller systems are widely used for remote control and/or actuation of devices or appliances such as garage door openers, gate openers, security systems, and the like. For example, most conventional garage door opener systems use a transmitter-receiver combination to selectively activate the drive source (i.e., motor) for opening or closing the door. The receiver is usually mounted adjacent to the motor and receives a coded signal (typically radio frequency) from the transmitter. The transmitter is typically carried in the vehicle by a user and selectively activated by the user to open or close the garage door.

Different manufacturers of such transmitter-receiver systems generally utilize different transmission protocols or patterns for transmitting the coded signal. They typically operate the transmitter-receiver systems at different transmission frequencies within the allocated frequency range for a particular type of system. The modulation pattern typically includes two aspects: 1) a device code (equivalent to a device address) for the transmitter and receiver, and 2) a transmission format, i.e., the characteristics of the transmitted signal including timing parameters and modulation characteristics related to encoded data. The transmission pattern used by one manufacturer is usually incompatible with that provided by other manufacturers.

Currently available transmitter-receiver systems typically employ custom encoders and decoders to implement the transmission pattern. These encoders and decoders are fabricated with custom integrated circuits such as application-specific integrated circuits (ASICs). They are fixed hardware devices and allow very limited flexibility in the encoding/decoding operation or in the modification of the encoding/decoding operation.

Thus, in such existing transmitter-receiver systems, it is necessary to know the transmission frequency accepted by the receiver and to match or determine the modulation pattern recognized by the receiver. In a number of transmitter-receiver systems, the modulation pattern is determined by setting a plurality of dual inline (DIP) switches (or a modulation pattern selection circuit) on the transmitter and by similarly setting a plurality of DIP switches (or a corresponding modulation pattern selection circuit) on the receiver. Once the required frequency and the modulation pattern are defined, a compatible transmitter can be provided to operate with the receiver. The DIP switches or the modulation pattern selection circuit may also be manually reset to match the modulation pattern of signals transmitted by a new transmitter to that of the existing receiver. Alternatively, both the existing receiver and new transmitter can be reprogrammed with a new modulation pattern. However, existing reprogramming techniques require prior knowledge of the transmission frequency and modulation protocol of the existing transmitter. In addition, they can only be implemented in compatible transmitters and receivers using complex circuits.

Accordingly, there is a need in the technology for an apparatus and method of providing a transmitter that can acquire the transmission frequency and modulation pattern of another transmitter/receiver system, without a prior knowledge of either of the parameters, and without manual selection of either of the parameters. There is also a need to provide a transmitter that is operable within a wide frequency spectrum and is compatible with any modulation scheme.

SUMMARY OF THE INVENTION

A method and apparatus for providing a universal transmitter that can detect and emulate a transmission signal of a transmitter, the transmission signal having a corresponding transmission frequency and a corresponding modulation pattern. The universal transmitter comprises: a detection circuit that detects a frequency and a modulation pattern of a transmitted signal of a separate transmitter and a memory. A processor coupled to the detection circuit and the memory, stores a frequency value representative of the detected frequency and a plurality of value representative of the detected modulation pattern, in the memory. A transmitting circuit coupled to the processor, is operable to transmit an output signal having the frequency and the modulation pattern of the transmission signal.

BRIEF DESCRIPTION OF THE DRAWINGS

FIGS. 3A and 3B illustrate a detailed block diagram of the universal transmitter of FIG. 2.

FIG. 6 is a flow diagram illustrating one embodiment of the LEARN process performed by the universal transmitter of the present invention.

DESCRIPTION OF PREFERRED EMBODIMENTS

The present invention provides a universal remote control transmitter that may be programmed to actuate any remote control receiver without prior knowledge of the transmission frequency and modulation pattern recognized by the receiver. The transmitter of this invention is universal in that it is capable of transmitting at any frequency that is allocated for remote control devices and is capable of being programmed to generate a modulated signal with any modulation pattern based on any modulation protocol. The universal transmitter is capable of being tuned and encoded with the modulation pattern that matches the transmission pattern of any remote control transmitter.

Figure 1:
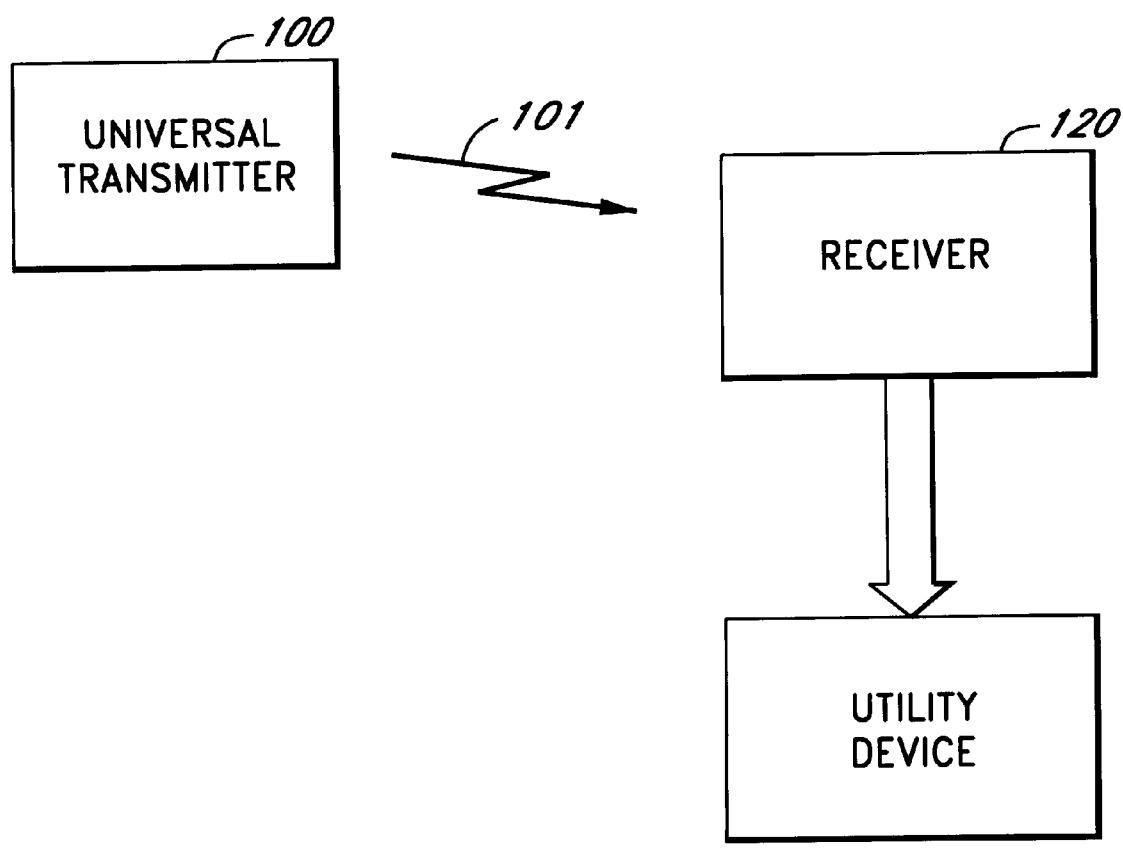
FIG. 1 is a block diagram illustrating a transmitter-receiver system that utilizes one embodiment of the invention.

Referring now to the drawings, and in particular to FIG. 1, there is shown a block diagram of a typical transmitter-receiver system. In FIG. 1, transmitter 100 is any suitable transmitter capable of generating an electromagnetic wave represented by the arrow 101. The frequency of the signal 101 generated by transmitter 100 and the encoding and data transmission scheme is a function of the particular transmitter design. A receiver 120 is adapted to receive the signals 101 from the transmitter 100, interpret the signals and produce an output signal to drive a utility device 130.

In a representative utilization, the transmitter 100 is a remote control device which can be used with the receiver 120 as part of a garage door opening system. In this representative utilization, utility device 130 may be the garage door mechanism, including the motor, drive mechanism, lighting apparatus and/or the like. For example, the utility device 130 opens or closes a garage door when activated by receiver 120 upon receipt of the appropriate signal from the transmitter 100. While a garage door opening mechanism is illustrative, many other types of utility devices may be controlled by such remote transmitter-receiver systems.

When activated, the transmitter 100 generates a signal 101 having a predetermined signal frequency and a unique data transmission format, that is, the timing parameters and modulation characteristics related to encoded data are unique to the design of the particular transmitter. The receiver 120 is adapted to receive and decode the signals generated by the transmitter 100 to produce an output signal which is supplied to the utility device 130. In one embodiment, the transmitter 100 and the receiver 120 transmit and receive at a single transmission frequency, using a single data transmission format. In alternative embodiments, multi-format and/or multi-frequency systems may be implemented.

Figure 2:
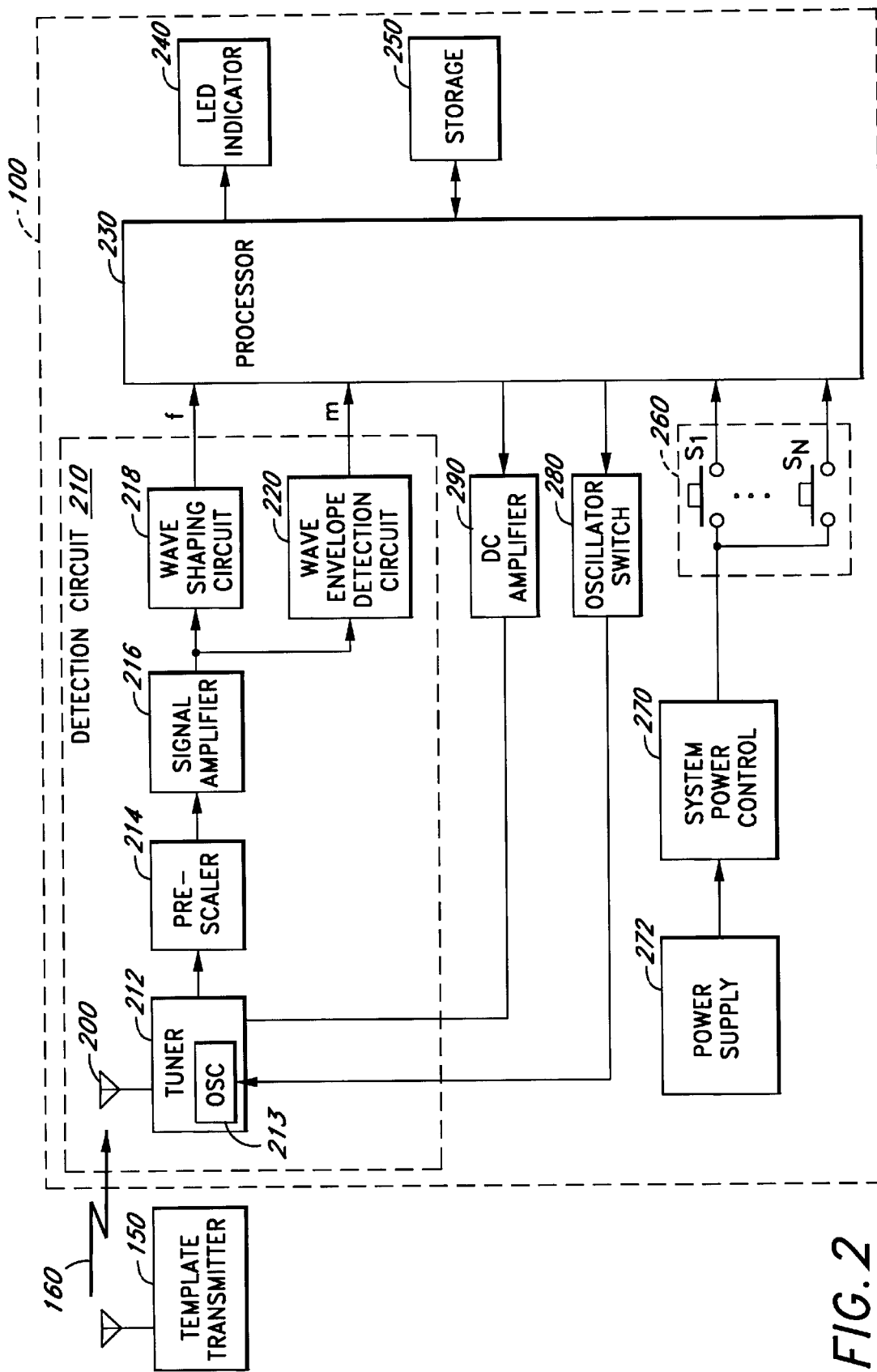
FIG. 2 is a block diagram illustrating one operating mode of one embodiment of the universal transmitter of the present invention.
Figure 3B:
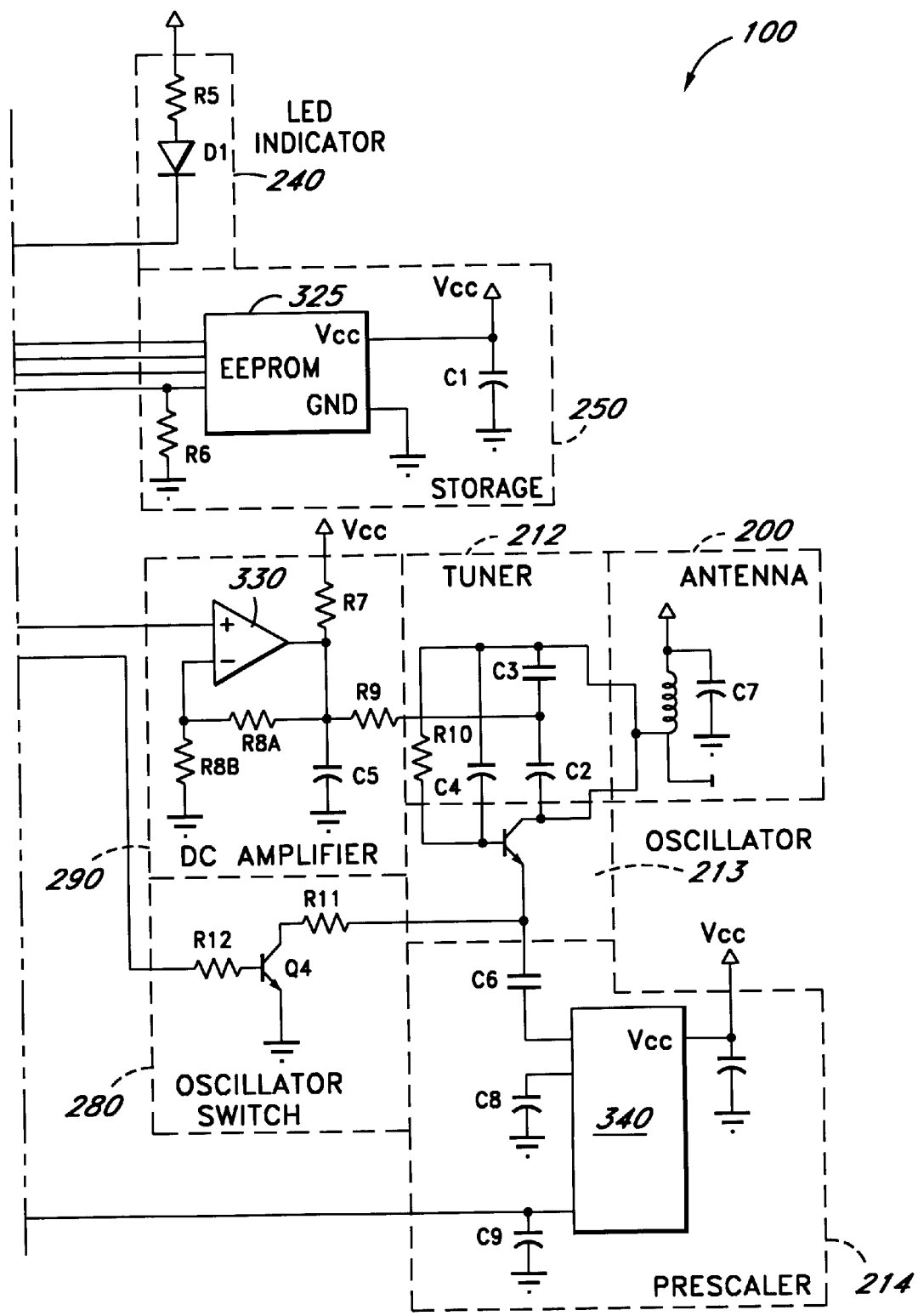

FIG. 2 is a block diagram illustrating one operating mode of the transmitter of the present invention, while FIGS. 3A & 3B illustrate a detailed block diagram of the universal transmitter of FIG. 2. The universal transmitter 100 of the present invention is capable of determining the frequency and modulation pattern of an existing transmitter 150, which serves as a template to the universal transmitter 100. In one embodiment, the template transmitter 150 is a transmitter that emits a signal at a particular frequency and with a particular modulation pattern that is recognized by the receiver of a remote controlled device such as receiver 120 (FIG. 1), and functions to actuate that device. In one embodiment, the modulation pattern is a pulse-code modulation pattern. However, in alternative embodiments, the transmission pattern may be any known transmission pattern, for example, frequency shift keying and pulse amplitude modulation. After the frequency and modulation pattern are determined, the programmed universal transmitter 100 functions to actuate the same device or devices controlled by the template transmitter 150.

In one embodiment, the universal transmitter 100 comprises an antenna 200 that receives a modulated signal, a detection circuit 210 that scales the frequency of a received signal to a lower frequency for frequency determination. The detection circuit 210 also demodulates the output signal from the receiver to determine the modulation pattern of a received signal without requiring prior knowledge of the modulation protocol used. The universal transmitter 100 further comprises a processor 230, an indicator 240 such as a light emitting diode (LED), a storage device 250 such as memory, a plurality of switches 260, a system power control circuit 270, an oscillator switch 280, and an output signal amplifier 290. In one embodiment, the processor 230 is a microcontroller. In one embodiment, the storage device 250 is nonvolatile, i.e., capable of storing data for an extended period (e.g., 10 years) in the absence of an applied voltage. One example of such nonvolatile storage is an electrically erasable programmable read-only memory device (EEPROM). The detection circuit 210 comprises a tuner 212, an oscillator 213 such as a voltage-controlled oscillator (VCO), a pre-scaler circuit 214, a signal amplifier 216, a wave shaping circuit 218 and a wave envelope detection circuit 220. The processor 230 provides control signals to the DC amplifier via a digital-to-analog (D/A) output interface circuit (not shown), which subsequently provides the control signals to the oscillator 213 in tuner 212.

The frequency of the universal transmitter 100 is matched to that transmitted by the template transmitter 150 by detecting the frequency of the signal 160 emitted from the template transmitter 150 and subsequently tuning the frequency transmitted by the universal transmitter to match the frequency detected. This can be accomplished by coupling the transmitter 100 to a low sensitivity receiver in the universal transmitter 100, as represented by the antenna 200 and the detection circuit 210. Upon receiving the transmission signal 160 from the template transmitter 150, the universal transmitter 100 demodulates the encoded signal 160 and stores the resulting modulation pattern in binary form in storage 250. The universal transmitter 100 is thereby programmed to transmit the frequency and modulation pattern of the template transmitter 150.

As shown in FIGS. 2, 3A and 3B, the antenna 200 is coupled to a tuner 212 that is subsequently coupled to a wide band pre-scaler circuit 214. In one embodiment, the antenna 200 is part of a resonant circuit. In one embodiment, the pre-scaler circuit 214 is a wide-band pre-scaler circuit 214. In another embodiment, the pre-scaler circuit 214 is a divider circuit. In one embodiment, the output of the oscillator 213 is coupled via a suitable capacitor (such as C6) to an input of the pre-scaler circuit 214. Thus, the signal 160 as received by the antenna 200 is divided by the pre-scaler circuit 214. The result is a signal having a frequency that is sufficiently low to be detected and determined by the processor 230. Since the divider ratio of the pre-scaler circuit 214 is known, the frequency of the transmitted signal 160 can be calculated from the pre-scaled signal.

One example of the frequency detection of a transmitted signal, e.g. 160, will now be described. A signal in the lower limit of the controllable frequency range of the oscillator 213 is first generated by the oscillator 213 and provided to the input of the pre-scaler circuit 214. The output of the pre-scaler circuit 214 provides a signal that is proportional to the input frequency, i.e. the transmission frequency of signal 160. For example, where the pre-scaler circuit 214 is a divider circuit such as a divide-by-256 circuit, the frequency of the output signal of the pre-scaler circuit 214 may be expressed as: $F(out)=F(in)/256$. The resulting signal is amplified by amplifier 216 (such as a bipolar transistor arranged in a common emitter configuration as shown in FIGS. 3A and 3B). The amplified signal is then provided to a wave shaping circuit 218 for wave shaping and level shifting, so as to enable accurate reading of the frequency signal by the processor 230. The amplified signal is also provided to a wave envelope detection circuit 220, which provides the modulation pattern of the signal 160 by detecting the envelope of the scaled carrier signal. Once determined, the detected frequency and modulation pattern of the transmitted signal are stored in storage device 250.

The output of the wave-shaping circuit 218 is coupled to an input of the processor 230. If the detected signal 160 is within the operating range of the oscillator 213 circuit 218 (FIG. 2) or 360 (FIG. 3A) will provide scaled frequency pulses to the processor 230. In one embodiment, the oscillator 213 generates a signal in the frequency range of 280–450 MHz and is controlled by the processor 230 via the DC amplifier 290. The frequency signal of oscillator 213 is coupled back to the pre-scaler circuit 214 via the DC amplitude 210 and tuner 212. The frequency and modulation pattern of the signal 160 is stored in non-volatile storage 250 may be either used immediately for retransmission to operate a device (e.g. the utility device in FIG. 1) or stored as a reference value for future use. Such storage enables the processor 230 to by the processor 230, the lock the output of the oscillator 213 to the desired frequency for future use.

In particular, the output of the DC amplifier 290 is applied as a control input signal to the oscillator 213. The output frequency of the signal generated by the transmitter 100 will increase or decrease according to the magnitude of the control input signal (which, for example, may be a control input voltage) from the DC amplifier 290. In one embodiment, oscillator 213 is tunable to frequencies between 280 MHz and 450 MHz using an input control signal of between 0 and 6 volts. In one embodiment, the oscillator 213 comprises a varactor diode, two transmitters, capacitors, resistors and an inductor coupled to provide the required frequency output for a given input voltage. The processor 230 causes the frequency of the oscillator 213 to vary over a preselected range (e.g. 280 to 450 MHz), by sequentially setting the DC amplifier 290 with appropriate values. The oscillator's 213 operating frequency can be calculated from the pulse count signal output of the wave shaping circuit 218, as detected by the processor 230. The frequency may be expressed as follows:

F(oscillator 213)=Pulse Count/(Elapsed time*256)

Figure 4:
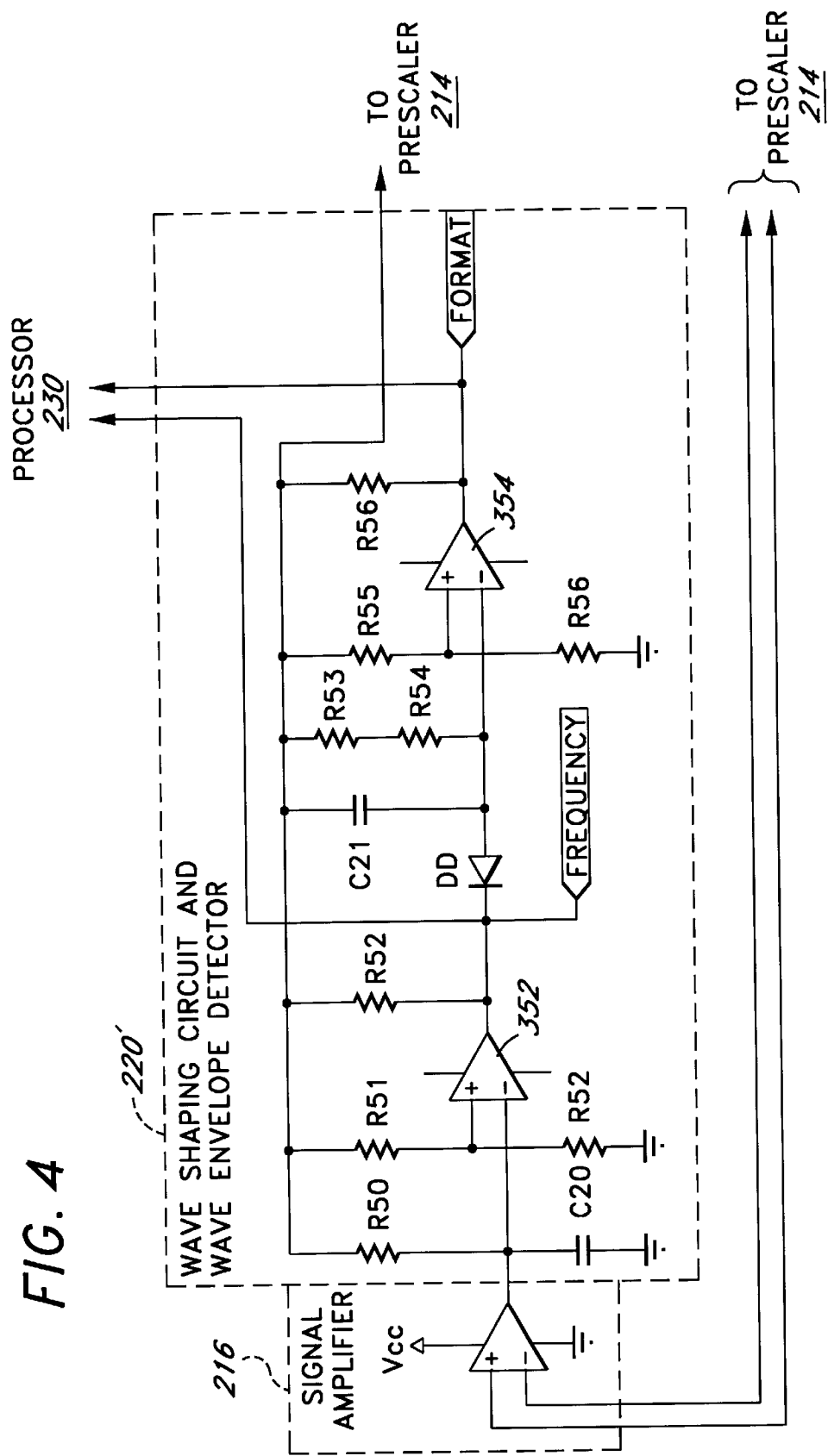
FIG. 4 illustrates an alternate embodiment of the wave shaping circuit 218 and the wave envelope detector 220 of FIG. 3A.

FIG. 4 illustrates an alternative embodiment of the wave shaping circuit 218 and the wave envelope detector 220 as shown in FIG. 3A. As shown in FIG. 4, the wave shaping circuit 218 and the wave envelope detector 220 of FIG. 3A, may be replaced by the wave shaping and wave envelope detector 220'. In particular, signals from the prescaler circuit 214 are amplified by op amp 216, which provides the amplified signal to amp 352. Op amp 352 provides wave shaping and level shifting to enable accurate reading of the frequency of the detected signal by the processor 230. The amplified signal (provided at the output of signal amplification 216) is also provided to the op amp 354, which provides the modulation pattern of the detected signal by detecting the envelope of the scaled carrier signal. The output of op amp 354 is also provided to the processor 230 for further processing, as discussed in earlier sections.

Figure 5:
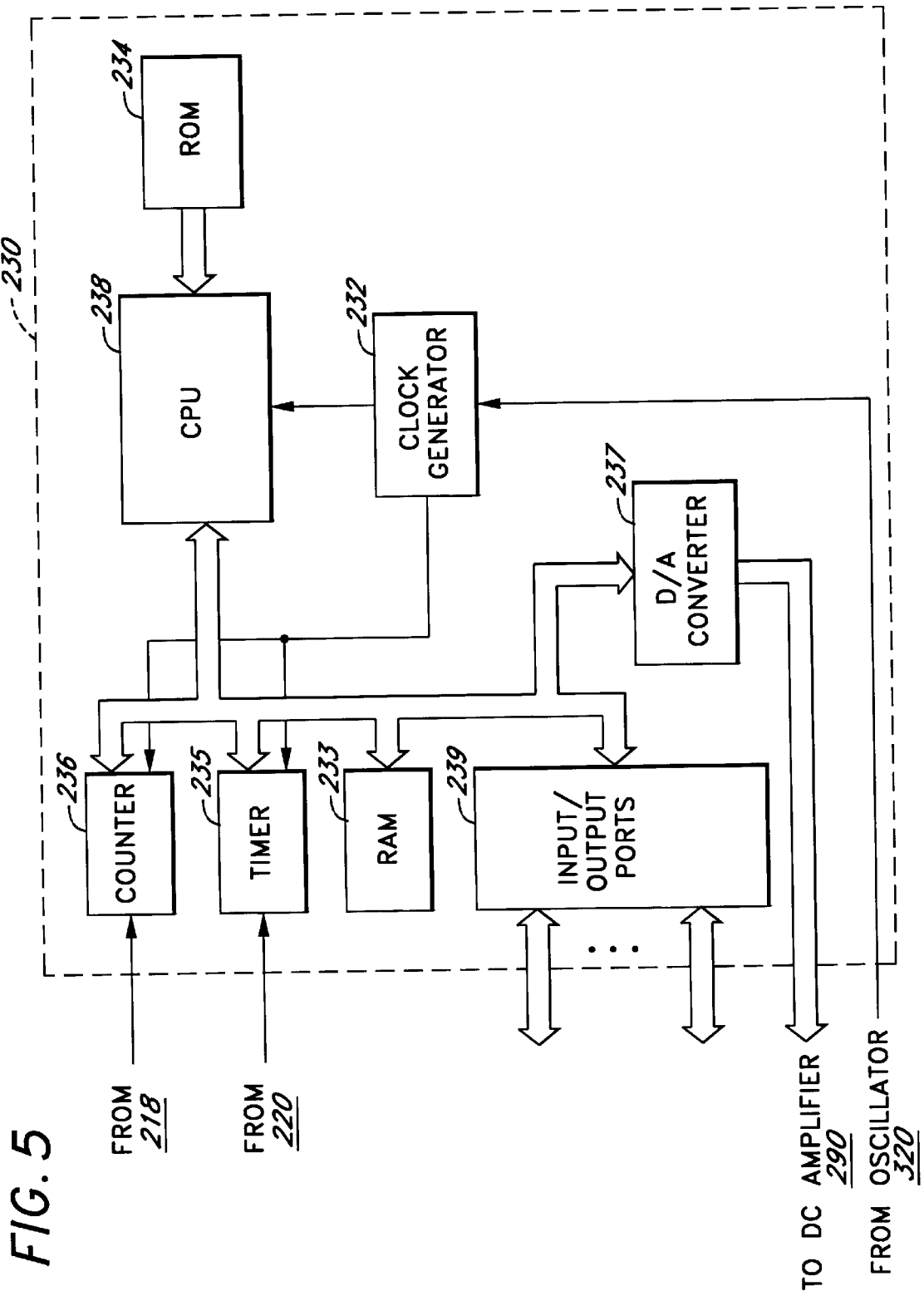
FIG. 5 is block diagram of one embodiment of the processor 230 of FIG. 2.

FIG. 5 is an overall functional block diagram of the processor 230 in accordance with one embodiment of the invention. The processor 230 comprises a clock generator 232 that provides for internal timing, memory 233 (such as random access memory RAM) for storing time intervals representative of the modulation pattern, read-only memory (ROM) 234 for the storage of the internal program(s) that controls the functions of the processor, input and output circuitry (not shown), a timer 235 for measuring the on and off intervals of the modulated signal, a counter 236 for measuring the pulses of the scaled carrier signal, a digital-to-analog converter (DAC) 237 to control the oscillator frequency, a central processor unit 238 (CPU) and input/output ports 239.

The value loaded into the D/A converter 237 at the time of such signal detection is representative of the input signal frequency being generated by the voltage controlled oscillator 213. If the frequency deviates from the desired value, the DC tuning voltage of the oscillator 213 is adjusted until the control voltage results in a frequency that matches with the desired frequency stored in the processor.

Operation of the "learning mode" configuration of the universal transmitter will now be described with reference to FIGS. 2–5. The template remote control transmitter 150 which emits a modulated signal 160 such as a pulse-modulated RF signal, is placed in proximity to the universal transmitter 100. The frequency and modulation pattern of the incoming signal 160 from the template transmitter 150 is automatically determined or "learned," that is, received and detected, without necessity for manual tuning and signal peak detection by a technician. In one embodiment, the signal 160 operates within the range of 20–900 MHz. A plurality of sets of such parameters (transmission frequency, modulation pattern and any other parameter) may be thus acquired and stored in storage 250. Each set of parameters may be retrieved by depressing a corresponding transmit switch S1, . . . , S8 in the plurality of transmit switches 260. Once the selected transmit switch S1, . . . , S8 is depressed, power will be provided from the power supply 272 via the system power control 270. The processor 230 will poll its ports to determine the transmit switch S1, . . . , S8 that is depressed and proceed to retrieve the corresponding set of parameters.

Once the frequency of the signal 160 has been determined, the universal transmitter 100 may be used to generate a signal representative of the signal 160, in the manner shown in FIG. 1. This is accomplished as follows. The oscillator 213 in tuner 212 generates a signal in the frequency range of the signal 160 and is controlled by a direct current (DC) tuning voltage which is supplied from the digital-to-analog output port of the processor 230 and amplified by the DC amplifier 290. The antenna 200 of the universal transmitter 100 functions in conjunction with the oscillator 213 to generate and transmit a transmission frequency. The oscillator's 213 frequency is adjustable or tunable via a electronically variable capacitor C2 (FIGS. 3A & 3B). (An example of the variable capacitor C6 is a varactor diode). The control voltage is adjusted to such a value that the voltage-controlled oscillator 213 output frequency is closest to the measured frequency from the template transmitter 150. This value is representative of the input signal frequency being "learned" and subsequently stored by the processor 230 in storage 250.

A control signal is supplied to the oscillator 213 through an oscillator switch 280 which, in one embodiment, is an electronic on/off switch. In one embodiment, the transmitted power of the transmitter 100 is limited by the Federal Communications Commission (FCC) regulations. Accordingly, in that embodiment, the transmitted power should be as close to the maximum limit possible under these regulations to maximize actuation range. In one embodiment, the switch 280 is a bipolar transistor arranged in a common emitter configuration, as shown in FIG. 3. In response to a control signal from processor 230, the switch 280 supplies current to the oscillator 213 for operation. The processor 230 functions in response to one of the plurality of transmit switches S1, . . . , S8 to retrieve ON and OFF intervals stored in the storage 250. The processor 230 duplicates the modulation pattern embodied in the stored intervals, by activating the oscillator switch 280 during the ON intervals and deactivating the switch 280 during the OFF intervals.

FIG. 6 is a flow diagram illustrating one embodiment of the LEARN process performed by the universal transmitter of the present invention. The LEARN process includes two processes: 500A, in which the signal frequency is determined, and 500B, in which the modulation pattern is determined. Beginning from a start state, the process 500 proceeds to process block 510, where the signal 160 is transmitted from the template transmitter to the universal transmitter 100. The process 500 advances to process block 520, where it is scaled by the pre-scalar circuit 214 and amplified by amplifier 216.

The process 500 then proceeds from process block 520 to process block 530, where the amplified signal is level shifted by the wave shaping circuit 218, and then provided to the counter input of the processor 230. In addition, the envelope of the amplified signal is detected by the envelope detection circuit 220. Process 500 next proceeds to process block 540, where the transitions in the waveform of the signal are counted using the counter 236 in the processor 230. Alternatively, the transitions may be counted by a software routine executed by the processor 230 by examining the input port line.

The output of the wave envelope detection circuit 220 is continuously scanned by the processor 230, to obtain the waveform of the transmitted signal as a series of ON and OFF time intervals. The resulting time intervals are stored in RAM 233 in the processor 230. In one embodiment as shown in FIG. 3, the wave envelope detection circuit 220 is a comparator. In this embodiment, the processor 230 continuously scans the output of the comparator for a transition between the two levels of the signal presented at the output of that comparator. Whenever a transition in either direction between the two rail supplies of comparator is detected, the processor 230 interprets successive values of the timer to represent alternating On and OFF times of the modulation pattern represented on the output of comparator.

The process 500 then proceeds to process block 550, where the signal frequency is then determined from the count, obtained in process block 540A and the timing intervals as obtained in process block 540. The modulation is also derived from the signal frequency and timing intervals. The process 500 then advances to process block 560, where the processor 230 stores the value of the signal frequency and modulation pattern in memory 250.

In particular, when in process block 560, the processor 230 records the ON and OFF time intervals of the waveform and stores the result as successive values in a table in memory 250. In particular, upon initiation of the LEARN mode, a pointer to the data table which holds the ON and OFF time intervals is initialized to point to the starting address in the table. When signal level transitions are detected, the time values are stored in the memory table in accordance with the address determined by the pointer value. The pointer is then incremented. If the pointer value has not reached its end point value, then program control is returned to continue filling up the memory table with values of the ON and OFF time intervals representative of the modulation pattern that is being stored. At the end of the LEARN mode, the memory table of ON and OFF times is full. The processor 230 then examines the stored values to determine if there is a repeating pattern of the ON and OFF values. When such a pattern is detected, only a single complete pattern is stored in the memory 250 of the universal transmitter 100. Upon storing the signal frequency and modulation pattern, the process 500 terminates.

Figure 7A:
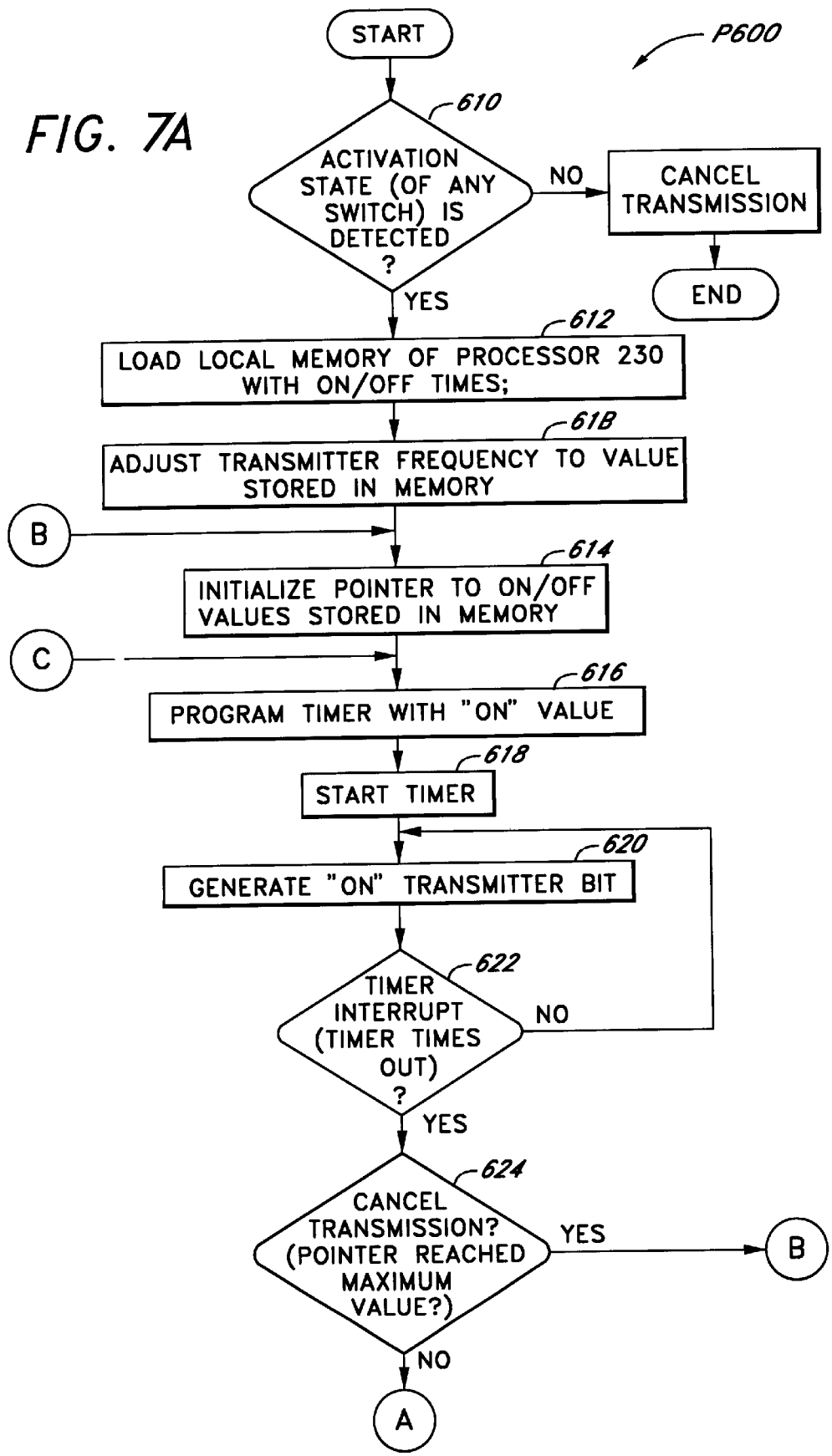
FIGS. 7A and 7B illustrate a flow diagram of one embodiment of the transmission operation of the universal transmitter of the present invention.
Figure 7B:
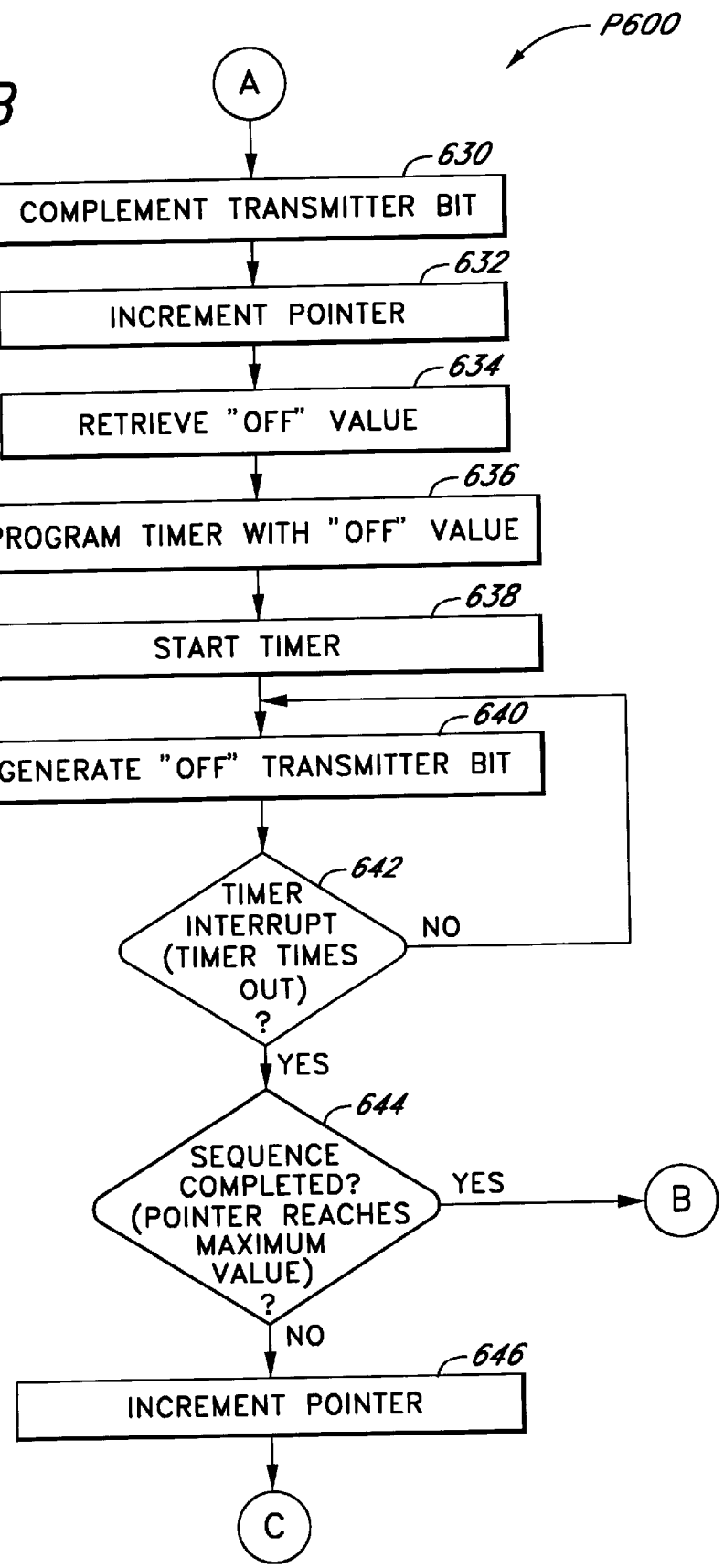

FIGS. 7A and 7B are flow diagrams which illustrate one embodiment of the transmission process of the universal transmitter of the present invention. Beginning from a start state, the transmission process 600 proceeds with initialization, when an activation state represented by activation of any one of the eight switches S1–S8, is detected (decision block 610). Upon detection of such state, the local or scratch pad memory (such as RAM 233) of the processor 230 is loaded with ON and OFF times representing the desired modulation pattern from the external memory 250 (which have been previously determined during the LEARN process described above), as shown in processor block 612.

The process 600 then adjusts the transmitter 100 frequency to the value stored in memory such as RAM 233. Next, the process 600 proceeds to process block 614, where a data pointer into the local memory of processor 230 is initialized. The timer 235 is programmed with the contents of the first entry in the local scratch pad memory e.g., RAM 233, which in one embodiment, is the value of the ON time interval, as shown in process block 616.

The process 600 then advances to process block 618, where the timer is started, and its duration is governed in accordance with the value loaded to the timer from the scratch pad table, e.g., RAM 233. The "ON" transmitter bit is then generated and transmitted via antenna 200, as shown in process block 620. In particular, during the operation of the timer, transistor switch will be rendered conductive thereby enabling free running oscillator to emit a signal via the antenna 200 at a frequency previously determined via programmable tuning voltage. The switch 280 enables the voltage controlled oscillator 213 only during ON times designated by the timer 235. The process 600 then proceeds to decision block 622, where it determines if the timer has timed out. If not, the process 600 returns to process block 620. Otherwise, the process 600 proceeds to decision block 624, where it queries if transmission should be canceled, i.e., queries if the pointer has reached its maximum value, as shown in decision block 624. If so, the process 600 returns to process block 614. Otherwise, it proceeds to process block 630.

When the programmable timer has timed out and transmission is not canceled, an interrupt is generated transferring program control to the interrupt service routine. During interrupt servicing, the state of a bit monitoring the state of the transmit switch is complemented, and the LED indicator is switched accordingly (process block 630). When the processor 230 detects the change, the pointer is incremented (process block 632) and a new timing value (which in the present example, is an "OFF" value) is retrieved (process block 634) and loaded into the timer in accordance with the table value designated by the pointer (process block 636). The process 600 then proceeds to start the timer, as shown in process block 638. The process 600 then generates the "OFF" transmitter bit. It will be seen that by complementing the transmit bit upon each entry into the interrupt service routine, the time intervals in the timer will alternatively indicate ON and OFF times in accordance with the desired modulation pattern to be transmitted by the universal transmitter.

The process 600 next advances to decision block 642, where it determines if the timer has timed out. If not, the process 600 returns to process block 640. Otherwise, it proceeds to decision block 644, where it determines if the entire modulation sequence has been transmitted. In particular, the processor 230 examines the table pointer to determine it the pointer has reached its maximum value. If so, the process 600 proceeds to repeat the transmission cycle, as shown in process block 625. If not, the process 600 increments the pointer (process block 646), and then returns to process block 616.

The present invention thus provides a universal transmitter that is capable of acquiring the carrier frequency and modulation pattern of another transmitter without a prior knowledge of such frequency and modulation pattern. Such acquisition is also performed without manual reconfiguration of the universal transmitter. By implementing a wideband pre-scaling circuit and simple circuit to acquire the carrier frequency and modulation pattern, the cost of the universal transmitter is minimized.

While the preceding description has been directed to particular embodiments, it is understood that those skilled in the art may conceive modifications and/or variations to the specific embodiments and described herein. Any such modifications or variations which fall within the purview of this description are intended to be included therein as well. It is understood that the description herein is intended to be illustrative only and is not intended to limit the scope of the invention. Rather the scope of the invention described herein is limited only by the claims appended hereto.

What is claimed is:

1. A universal transmitter, comprising:
   a detection circuit to detect a frequency and a modulation pattern of a signal transmitted from a separate transmitter, the detection circuit including
      an antenna to receive the signal,
      a wave shaping circuit coupled to the antenna to condition the signal, and
      a wave envelope detection circuit coupled to the antenna to detect values corresponding to a plurality of timing intervals of the signal, each of said plurality of timing intervals being representative of a corresponding transmission period within a transmission cycle of the signal;
   a memory;
   a processor coupled to the detection circuit and the memory, the processor to (i) count a plurality of transitions of the signal, (ii) determine the timing intervals of the received signal, (iii) determine a frequency of the signal based on the count and the timing intervals, and (iv) store the frequency and values representative of the modulation pattern in the memory; and
   a transmitting circuit coupled to the processor, the transmitting circuit being operable to transmit an output signal having the frequency and the modulation pattern of the signal.

2. The transmitter of claim 1, wherein the processor is further configured to determine the values of the modulation pattern based on the count and the plurality of timing intervals.

3. The transmitter of claim 2, wherein the processor generates a first output signal, in response to an enable signal, the first output signal being representative of the frequency of the signal, and wherein the processor generates a plurality of signals representative of the modulation pattern of said signal.

4. The transmitter of claim 3, further comprising:
   a tuner circuit having an oscillator circuit, the tuner circuit being coupled to said processor and said antenna; and
   an oscillator switch coupled to said processor and said oscillator circuit,
   wherein the tuner circuit generates an output signal having the transmission frequency and the modulation pattern of the signal.

5. The universal transmitter of claim 3, further comprising:
   a power source; and
   a switch coupled between the power source and the processor, the switch being operable to generate the enable signal.

6. The universal transmitter of claim 1, wherein the frequency is in the radio frequency range.

7. A system for detecting and emulating a signal transmitted by a remote transmitter, the signal having a frequency and a modulation pattern, the system comprising:
   a detection circuit that detects a frequency and a modulation pattern of the signal of the transmitter, the detection circuit including
      an antenna to receive the signal,
      a wave shaping circuit coupled to the antenna to condition the signal, and
      a wave envelope detection circuit coupled to the antenna to detect values corresponding to a plurality of timing intervals of the signal, each of said plurality of timing intervals being representative of a corresponding transmission period within a transmission cycle of the signal;
   a memory;
   a processor coupled to the detection circuit and the memory, the processor to (i) count a plurality of transitions of the signal, (ii) determine the timing intervals of the received signal, (iii) determine a frequency of the signal based on the count and the timing intervals, and (iv) store the frequency and values representative of the modulation pattern in the memory; and
   a transmitting circuit coupled to the processor, the transmitting circuit being operable to transmit an output signal having the frequency and the modulation pattern of the signal.

8. The system of claim 7, wherein the processor is further configured to determine the values of the modulation pattern based on the plurality of timing intervals.

9. A method for a universal transmitter of detecting and emulating a transmission signal of a separate transmitter, the transmission signal having a transmission frequency and a modulation pattern, the method comprising:
   a receiving the transmission signal;
   (b) conditioning the transmission signal to provide a signal having enhanced transitions;
   (c) determining a number of counts between each enhanced transition;
   (d) determining a timing interval between each enhanced transition;
   (e) determining the transmission frequency and the modulation pattern of the transmission signal based on the number of counts and the timing interval between each enhanced transition;
   (f) storing the transmission frequency and the modulation pattern in memory; and
   (g) transmitting an output signal having the transmission frequency and the modulation pattern, in response to an enable signal,
   wherein the universal transmitter includes:
      a detection circuit to detect the transmission frequency and the modulation pattern of the transmission signal, the detection circuit including
         an antenna to receive the transmission signal,
         a wave shaping circuit coupled to the antenna to perform act (b), and
         a wave envelope detection circuit coupled to the antenna to detect values corresponding to a plurality of timing intervals of the transmission signal, each of said plurality of timing intervals being representative of a corresponding transmission period within a transmission cycle of the transmission signal;
      a memory;
      a processor coupled to the detection circuit and the memory, the processor to perform acts (c) through (f); and
      a transmitting circuit coupled to the processor, the transmitting circuit being operable to perform act (g).

10. The method of claim 9, wherein the transmission frequency is in the radio frequency range.

* * * * *